United States Patent
Schmidt et al.

(10) Patent No.: US 6,712,099 B2
(45) Date of Patent: Mar. 30, 2004

(54) THREE-DIMENSIONAL WEAVE ARCHITECTURE

(75) Inventors: Ronald P. Schmidt, Fort Worth, TX (US); Larry R. Bersuch, Ft. Worth, TX (US); Ross A. Benson, Willow Park, TX (US); Amir Islam, Bally, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 276 days.

(21) Appl. No.: 09/882,831

(22) Filed: Jun. 15, 2001

(65) Prior Publication Data

US 2002/0192450 A1 Dec. 19, 2002

(Under 37 CFR 1.47)

(51) Int. Cl.⁷ .............................................. D03D 11/00
(52) U.S. Cl. .............................. 139/383 R; 139/DIG. 1; 442/205
(58) Field of Search ........................ 139/383 R, DIG. 1; 442/205, 206, 207

(56) References Cited

U.S. PATENT DOCUMENTS

| | | | | |
|---|---|---|---|---|
| 4,379,798 A | * | 4/1983 | Palmer et al. ............... | 428/113 |
| 4,671,470 A | | 6/1987 | Jonas ........................... | 428/246 |
| 4,725,485 A | * | 2/1988 | Hirokawa ..................... | 442/187 |
| 4,782,864 A | * | 11/1988 | Abildskov ................... | 139/384 R |
| 5,026,595 A | | 6/1991 | Crawford, Jr. et al. ...... | 428/246 |
| 5,126,190 A | * | 6/1992 | Sakatani et al. ............. | 442/205 |
| 5,451,448 A | * | 9/1995 | Sawko et al. ................ | 428/175 |
| 5,465,760 A | * | 11/1995 | Mohamed et al. ............ | 139/11 |
| 5,480,697 A | * | 1/1996 | Bottger et al. ............... | 428/86 |
| 5,657,795 A | * | 8/1997 | Sawko et al. ................. | 139/11 |
| 5,665,451 A | * | 9/1997 | Dorn et al. ................... | 428/116 |
| 5,783,279 A | * | 7/1998 | Edgson et al. ............... | 428/116 |
| 6,019,138 A | * | 2/2000 | Malek et al. ................. | 139/1 R |
| 6,446,675 B1 | * | 9/2002 | Goering ....................... | 139/11 |

* cited by examiner

*Primary Examiner*—John J. Calvert
*Assistant Examiner*—Robert Muromoto, Jr.
(74) *Attorney, Agent, or Firm*—Bracewell & Patterson, L.L.P.

(57) ABSTRACT

A three-dimensional weave architecture for weaving preforms has fill fibers woven to provide layer-to-layer interlocking of layers of warp fiber as well as interlocking of fibers within each layer. The woven preform transfers out-of-plane loading through directed fibers to minimize interlaminar tension. The preform has a base and at least one leg extending from the base, the base and leg each having at least two layers of warp fibers. The fill fibers follow a weave sequence which carries them through part of the base, then into the legs, then through the other portion of the base, and back through the base to return to the starting point of the fill tow. The leg may be connected at a single- or distributed-column intersection, and the intersection may be radiussed. The outer ends of the base and legs may have tapers formed from terminating layers of warp fibers in a stepped pattern.

27 Claims, 4 Drawing Sheets

THREE-DIMENSIONAL WEAVE ARCHITECTURE

BACKGROUND OF THE INVENTION

1. Field of the Invention

This invention generally relates to weaving of preforms and particularly relates to weaving of preforms used in bonding of components at structural joints.

2. Description of the Prior Art

When joining components in a structural joint, layers of fabric infused with a polymer resin can be used to join the components. For example, two components are brought to the desired positions and orientation, and layers of composites are adhered to the outer surfaces of the components: one portion of the fabric adhering to one component, another portion adhering to the other component. Multiple layers of fabric are stacked to increase the strength of the joint and to form a radiussed intersection. While this method works well, the joint can be improved by having fibers that extend through the intersection of the components, connecting the composite layers on both sides of the joint. A 3-D, woven, textile preform provides for fibers that extend through the intersection of a joint. The preform is infused with a resin that is cured to form a rigid polymer matrix surrounding the fibers of the preform.

Weave patterns for woven composite textiles have been used in the past which can provide for various shapes of three-dimensional preforms. However, these weave patterns were typically single-layer connectors, for example, U.S. Pat. No. 4,671,470 to Jonas, in which is disclosed an H-shaped connector for connecting a wing spar to a sandwich skin structure. Also, three-dimensional preforms have been woven to fill gaps formed during layup of composite layers into tight radius intersections. A gap-filling preform is disclosed in U.S. Pat. No. 5,026,595 to Crawford, Jr., et al.

However, these prior-art preforms have been limited in their ability to withstand high out-of-plane loads, to be woven in an automated loom proces, and to provide for varying thickness of portions of the preform. Weave construction and automation of preform weaving was in its infancy and provided only a small advantage over conventional laminated, fiber-wound, or braided composites, limiting the versatility of the preforms.

SUMMARY OF THE INVENTION

A three-dimensional weave architecture for weaving preforms has fill fibers woven to provide layer-to-layer interlocking of layers of warp fiber as well as interlocking of fibers within each layer. The woven preform transfers out-of-plane loading through directed fibers to minimize interlaminar tension. The preform has a base and at least one leg extending from the base, the base and leg each having at least two layers of warp fibers. The fill fibers follow a weave sequence which carries them through part of the base, then into the legs, then through the other portion of the base, and back through the base to return to the starting point of the fill tow. The leg may be connected at a single- or distributed-column intersection, and the intersection may be radiussed. The outer ends of the base and legs may have tapers formed from terminating layers of warp fibers in a stepped pattern.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

A three-dimensional preform is created by weaving a tow pattern through several warp fibers that extend perpendicularly to the plane of the tow pattern. The warp fibers may comprise several layers, and all warp fibers in a preform are parallel to each other. The preform is usually woven from materials used for typical composites structures, for example, fiberglass and carbon fibers, and may have one of a variety of shapes, including T-, Pi-, X-, and L-shaped profiles, or may be flat. The shapes may have single, double, or triple legs, though the present invention is not limited to these variations. FIGS. 1 through 5 show tow patterns used to create woven preforms for structural joints. In the figures, the fill fibers are shown in the viewing plane, whereas the warp fibers are shown as perpendicular to the viewing plane.

Figure 1:
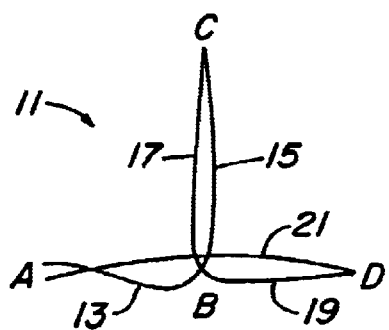
FIG. 1 depicts a global fill-tow weave pattern used to weave a T- or Pi-shaped preform in accordance with the invention.

FIG. 1 shows a fill-fiber tow pattern 11 for forming a T-shaped preform. The pattern begins at position A, and portion 13 is formed as the thread moves laterally toward the center of pattern 11 to position B. The thread is directed upward to position C, forming portion 15, then returns downward to position B, forming portion 17. The thread is directed toward position D, which is laterally opposed to A, and then returns to position A, forming portions 19 and 21 respectively. Portions 13, 19, and 21 form a base of pattern 11, whereas portions 15 and 17 form a leg. By forming a second loop (not shown) like that formed by portions 15 and 17, a Pi-shaped preform can be manufactured. The tow patterns are repeated on each layer of warp fibers when weaving a preform.

Figure 2:
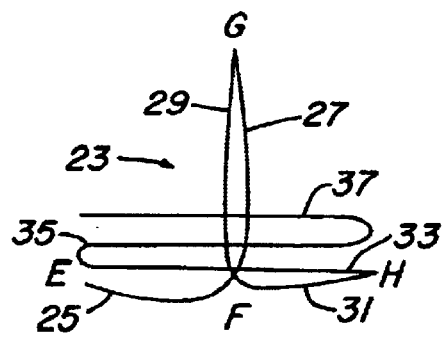
FIG. 2 depicts an alternative embodiment of the fill-tow weave pattern of FIG. 1 in accordance with the invention.

FIG. 2 is a tow pattern 23 like that in FIG. 1, but a base is formed from more portions than that in pattern 11. Pattern 23 begins at position E, and portion 25 is formed as the thread moves laterally toward the center of pattern 23 to position F. The thread is directed upward to position G, forming portion 27, then returns downward to position F, forming portion 29. The thread is directed toward position H, which is laterally opposed to E, and then returns to position E, forming portions 31 and 33, respectively. The thread is then directed back to position H, forming portion 35, and back to position E, forming portion 37. Portions 25, 31, 33, 35, and 37 form a base of pattern 23, whereas portions 27 and 29 form a leg. This back-and-forth base pattern provides for improved performance in response to out-of-plane loading by increasing the number of fibers which run across the base without being directed upward to form a leg. A second loop (not shown) like that formed by portions 27 and 29 can be added to form a pattern from which a Pi-shaped preform can be manufactured. This type of pattern is shown in FIG. 5 and described below.

Figure 3:
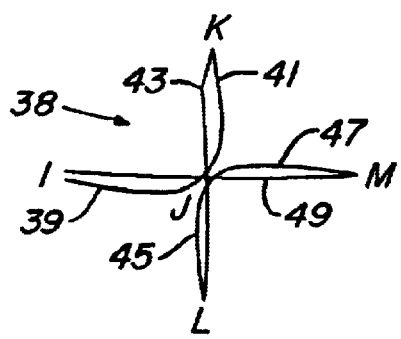
FIG. 3 depicts an alternative embodiment of the fill-tow weave pattern of FIG. 1 that is used to weave a cross-shaped preform in accordance with the invention.
Figure 4:
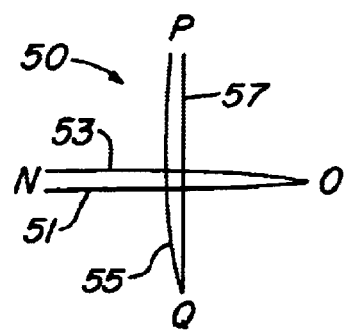
FIG. 4 depicts an alternative embodiment of the fill-tow weave pattern of FIG. 3 in accordance with the invention.

To form a cross-shaped preform, the patterns shown in FIGS. 3 and 4 are used. In FIG. 3, tow pattern 38 has a horizontal section formed by leg portions extending to positions I, J, and M, with I and M being laterally opposed and J being located between I and M. A vertical section passes through position J and extends from positions K and L, which are at opposite ends of the vertical section. Pattern 38 is created by using one thread to form the pattern. Starting at position I and moving laterally toward position J, the center of pattern 38, forms portion 39. The thread is directed upward to position K, forming portion 41, then portion 43 runs downward from position K to position L. The thread turns upward from position L and extends to position J, forming portion 45, then turns laterally, extending to position M. The thread then turns and returns laterally to position I. In pattern 38, only half of the portions in each leg extend between opposite ends through center position J, the other half connecting adjacent legs. For example, the leg extending from position J to position K has one portion 41 that is connected to the leg extending from I to J, whereas portion 43 extends to position L through position J.

Pattern 50 is shown in FIG. 4 and also has horizontal and vertical sections forming a cross-shaped pattern 50. However, unlike pattern 38 (FIG. 3), the pattern is formed from two threads and all of the portions extend between opposite ends through the center of pattern 50. The horizontal section is formed by starting one of the threads at position N and extending it to position O, forming portion 51. The thread then turns and returns to position N, forming portion 53. The same type of sequence is used for the vertical section, with a separate thread extending from position P to position Q to form portion 55 and from Q to P to form portion 57. The additional portions passing through the center of pattern 50 provide for greater strength in the woven preform.

Figure 5:
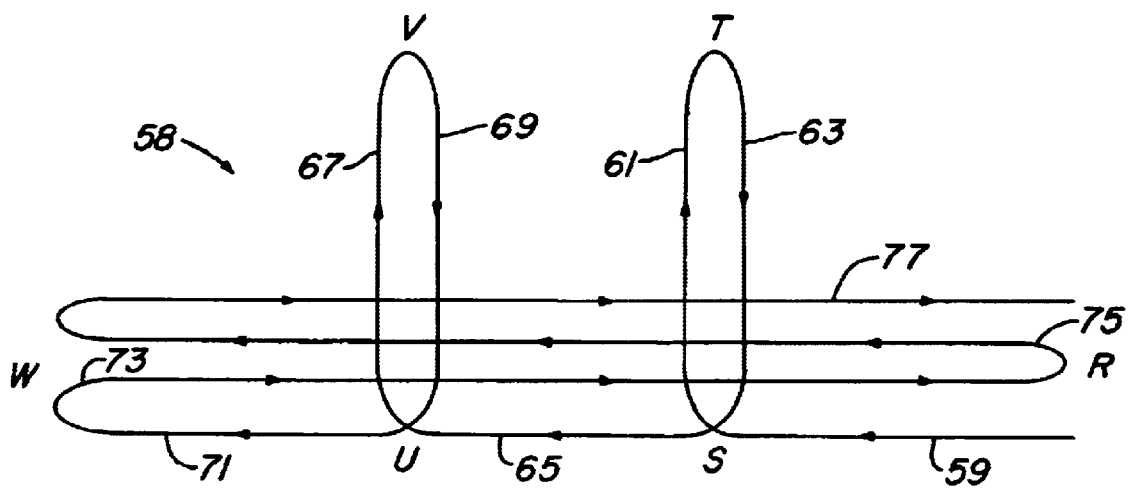
FIG. 5 depicts an alternative embodiment of the fill-tow weave pattern of FIG. 1 used to weave a Pi-shaped preform in accordance with the invention.

FIG. 5 is a tow pattern 58 used to form a Pi-shaped preform having a multiple-portion base like pattern 23 in FIG. 2. Pattern 58 begins at position R, and portion 59 is formed as the thread moves laterally toward the center of pattern 58 to position S. The thread is directed upward to position T, forming portion 61, then returns downward to position S, forming portion 63. This forms the first leg of the pattern. The thread is directed toward position U, forming portion 65, then upward to position V to form portion 67. The thread returns to position U, forming portion 69 and completing the second leg. The thread then travels to position W, which is laterally opposed to R, and returns to position R, forming portions 71 and 73, respectively. The thread is then directed back to position W, forming portion 75, and back to position R, forming portion 77. Portions 59, 65, 71, 73, 75, and 77 form a base of pattern 58, whereas portions 61, 63 and 67, 69 form legs.

Figure 6:
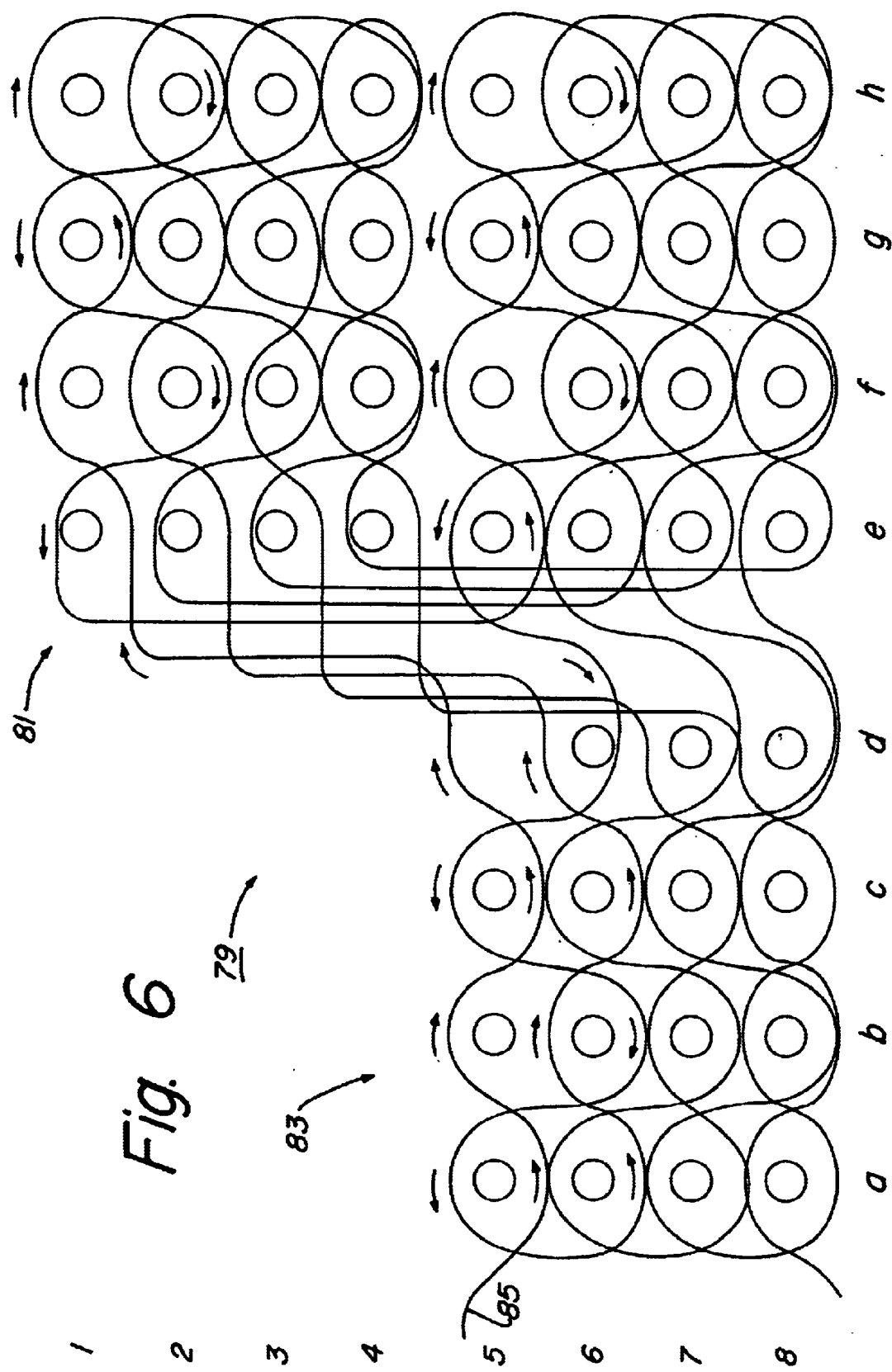
FIG. 6 is an enlarged view that depicts a substantially-single-column fill-tow weave pattern using the global pattern of FIG. 1 that is woven into layers of warp fibers and used to weave a T- or Pi-shaped preform in accordance with the invention.
Figure 7:
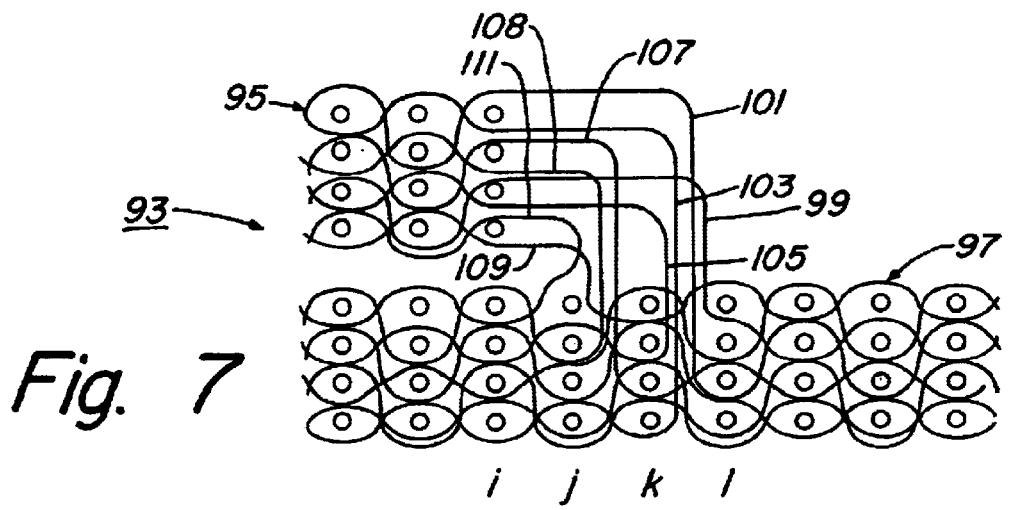
FIG. 7 depicts a distributed-column weave pattern using the global pattern of FIG. 1 that is woven into layers of warp fibers and used to weave a T- or Pi-shaped preform in accordance with the invention.
Figure 8:
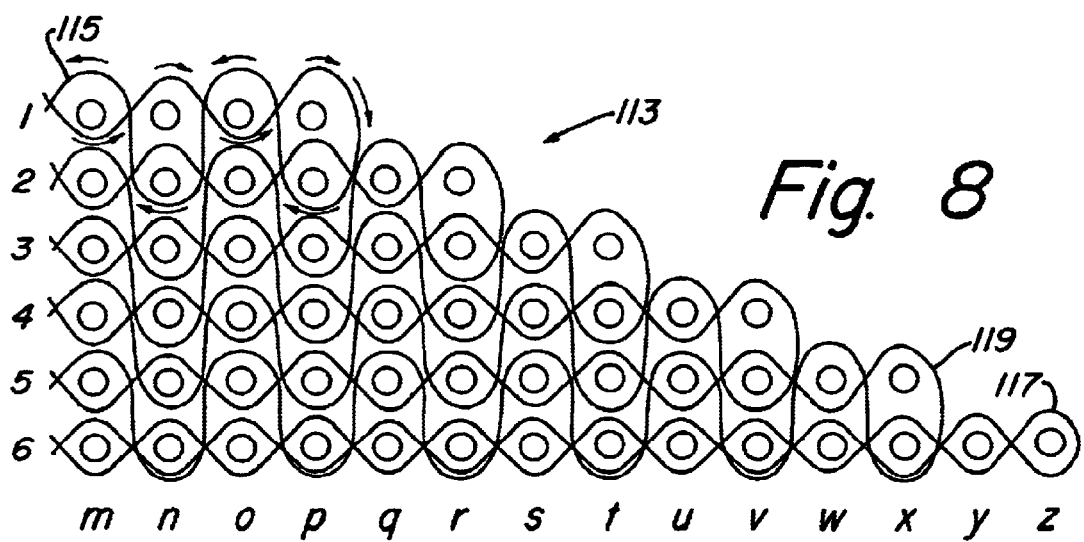
FIG. 8 depicts an alternate embodiment of a fill-tow weave pattern that is woven into layers of warp fibers and used to weave a tapered outer edge of the base portion of a preform in accordance with the invention.

FIGS. 6 through 8 show methods for weaving the tow patterns into warp fibers to produce three-dimensional preforms. FIGS. 6 and 7 show weave patterns used for weaving legs in T-shaped preforms or Pi-shaped preforms, each preform having a four-layer thickness in the base and four-layer width in each leg of a preform, though the patterns will work with more or less layers of warp fibers. Fill fibers are shown in the viewing plane of FIGS. 6 through 8. Each warp fiber is parallel to the others and is shown as perpendicular to the viewing plane.

FIG. 6 depicts a weave pattern 79 that provides for interlocking between layers of warp fibers and provides for a central, substantially-single-column intersection of leg 81 with base 83. For ease of description, the weave pattern will be described using the matrix formed by warp-fiber layers 1 through 8 and columns a through h. For example, the top, left-hand warp fiber in base 83 is designated a5, whereas the lower, right-hand fiber is h8. Leg 81 is woven in a laid-over, horizontal position, as shown, while the pattern is woven. Leg 81 is moved to a vertical, standing position after being woven, the width of leg 81 when standing upright comprising layers 1, 2, 3, and 4, the height comprising columns e, f, g, and h. The base comprises four layers 5, 6, 7, 8 and columns a, b, c, d, e, f, g, h. For the single-column intersection, substantially all of the threads that connect leg 81 to base 83 emerge from base 83 between columns d and e. Weave pattern 79 provides for interlocking between layers 1, 2, 3, 4 in leg 81 and between layers 5, 6, 7, 8 of base 83. Each group of layers are interlocked by running a portion of pattern 79 over a warp fiber in a first layer in a first column and below a warp fiber in an adjacent, second layer in an adjacent, second column, the second layer being below the first layer.

FIG. 6 illustrates the completed weave in a vertical section of a preform 79 using the global fill-tow pattern in FIG. 1. A single thread 85 is shown for the weave, though the weave may also be created using multiple threads. The section in FIG. 6 is approximately 0.2 inches thick. Arrows are used to indicate the direction a particular portion of the thread 85 is traveling in the description of the figure, though the weave can also be done in the reverse order. Thread 85 begins by interlocking columns a, b, c, and d only in layer 5 by alternately wrapping over and under the fibers of layer 5. Initially, thread 85 passes under warp fiber a5, then over fiber b5, then repeats the sequence, passing under fiber c5 and over fiber d5. Thread 85 then exits base 83 from between column d and e and travels into layers 1, 2, 3, and 4 at the inner end of leg 81, beginning the weave for leg 81 by passing under fiber e1, over fiber f1 under fiber g1, and over fiber h1 at the outer end of leg 81. Thread 85 then loops around to pass below fiber h2 and begins traveling back toward the inner end of leg 81. The return sequence interlocks layers 1 and 2 by then passing over fiber g1, under fiber f1, and over fiber e1.

Thread 85 reenters base 83 between columns d and e and continues through the remaining portion of base 83, interlocking the fibers in columns e through h of layer 5 in the same sequence as used for columns a through d. Thread 85 passes under fiber e5, over fiber f5, then under fiber g5 and over fiber h5 at the edge of base 83 opposite the edge where thread 85 begins. As happens at the outer end of leg 81, thread 85 loops around to pass below fiber h6 and begins traveling back toward the opposite edge of leg 81, interlocking layers 5 and 6. Thread 85 passes over fiber g5, under fiber f6, and over fiber e5, but thread 85 does not turn upward to go into leg 81, instead continuing across base 83 to interlock layers 5 and 6. Thread 85 passes under fiber d6, over fiber c5, under fiber b6, and over fiber a5, completing one complete fill-tow sequence. Thread 85 then loops around and under fiber a6 to begin a second fill-tow sequence, passing over fiber b6 and continuing the weave. During the weaving process, the loom indexes downward to accommodate the change in layers for as many times as there are layers.

When layers 1 through 8 have been woven in one vertical section, thread 85 may loop back up and under fiber a5 to repeat the weave sequence in a vertical section adjacent to the section of FIG. 6. Alternatively, thread 85 may begin the sequence in reverse by starting the weave sequence at layer 8 and moving up through the layers, ending on layer 5. Though not shown in the figures, use of either of the tow patterns of FIGS. 2 and 5 to weave a preform necessitates additional layers in the base. For example, the base would have twice as many layers as the leg to accommodate the extra thread portions passing across the base without entering the leg(s).

FIG. 7 shows a preform weave pattern 93 having a distributed intersection. Like weave pattern 79, pattern 93 forms a leg 95 and a base 97, base 97 and leg 95 having a plurality of columns of warp fibers. Leg 95 is woven while in a horizontal position, leg 95 being moved to a vertical, standing orientation after being woven. The central columns of base 97 are labeled as i, j, k, and l. Unlike pattern 79, though, threads 99, 101, 103, 105, 107, 108, 109, 111 connect leg 95 to base 97 at multiple positions, the positions being located between columns i and j, between columns j and k, and between columns k and l. For example, threads 107, 108, and 109 connect leg 95 to base 97 between columns j and k. This provides for the load to be distributed between warp fibers in several columns, rather than a significant majority of the loading being between two columns, as is true in pattern 79.

A tapered edge can be formed on an outer edge of a preform by terminating successive layers of warp fibers at lengths which are longer than prior layers. A preform having a tapered edge has a better resistance to peel loads than a preform in which the warp-fiber layers all terminate at the same length. FIG. 8 shows a weave pattern 113 for a six-layer preform section, only one outer end of the preform being shown in the figure, the weave producing a tapered edge. The same interlocking sequence as described for FIGS. 6 and 7 is continued outward to the start of the taper. Thread 115 begins by interlocking the fibers in only layer 1 by wrapping under fiber m1, then over fiber n1 and under fiber o1. To start the taper, thread 115 wraps over fiber p1, then is directed downward, terminating layer 1. Thread 115 then reverses direction to wrap under fiber p2 and travels over fiber o1, under fiber n2, and over fiber m1. Layer 2 is terminated in the same manner, but layer 2 terminates at column r. Each subsequent layer also terminates at a length two columns longer than the layer immediately above, e.g., layer 3 ends at column t. The stepped edge creates a tapered profile which can be made more steep by shortening the extra length of each layer to only one column or can be made more shallow by lengthening the stepped ends of the layers. Rather than the interlocking weave pattern of layers 1 through 5, thread 117 begins at column m and alternately wraps over and under only the fibers of layer 6, then reverses direction at column z and wraps over and under the fibers on the opposite side of layer 6. Layer 6 is interlocked with layer 5 by thread 119 at columns n, p, r, t, v, and x. Though not shown in the figures, when a tapered edge is added to the edge of a preform such as preform 79 in FIG. 6, various techniques are available for providing that thread 85 begins and ends at the same location as shown in FIG. 6 or at other desired locations.

Figure 9:
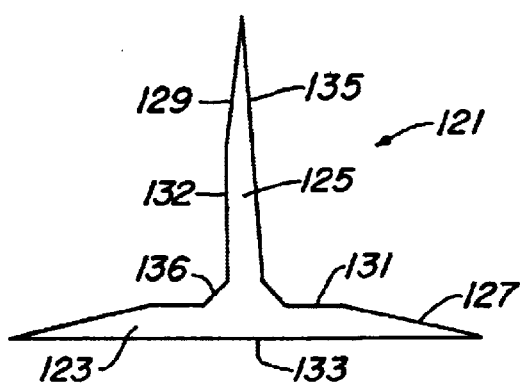
FIG. 9 depicts a complete, T-shaped, three-dimensional preform having tapered ends and in accordance with the invention.

A completed, woven, T-shaped preform 121, as shown in FIG. 9, has a base 123 and a leg 125, base 123 having tapers 127 at its outer ends, leg 125 having a taper 129 on one side of the upper end of leg 125. An untapered surface 131 of base 123 extends from each lateral side of the lower end of leg 125, each surface 131 extending to the beginning of taper 127. Likewise, an untapered surface 132 of leg 125 extends upward from the base 123 at a lower end of leg 125, surface 132 extending to the beginning of taper 129. Preform 121 is used to assemble components, the components being adhered to surface 133 of base 123 and surface 135 of leg 125. Tapers 127 and 129 increase the resistance of the adhesive joints to a peeling load. An additional feature shown on preform 121 are radiussed areas 136 where leg 125 and base 123 intersect. The radius 136 is formed in a manner similar to that for a taper, but additional layers are added to the base of leg 125 while weaving preform 121, the additional layers forming a stepped pattern.

Figure 10:
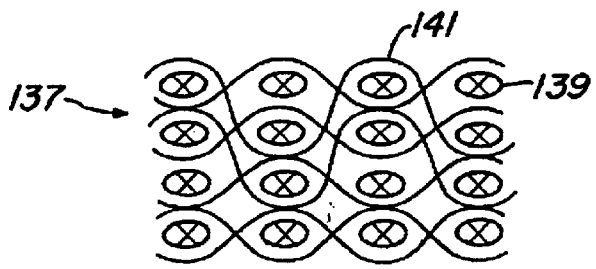
FIG. 10 depicts a fill-tow weave pattern used to weave a hybrid preform with glass fill fibers woven into layers of carbon warp fibers and being in accordance with the invention.
Figure 11:
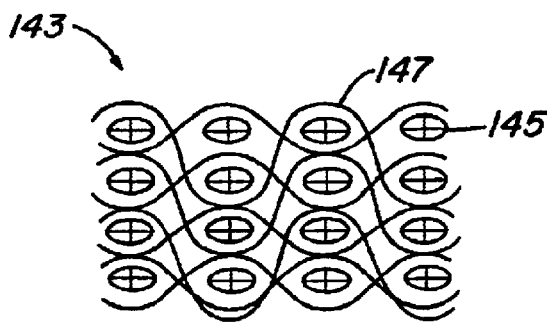
FIG. 11 depicts a fill-tow weave pattern and used to weave a hybrid preform with carbon fill fibers woven into layers of glass warp fibers and being in accordance with the invention.
Figure 12:
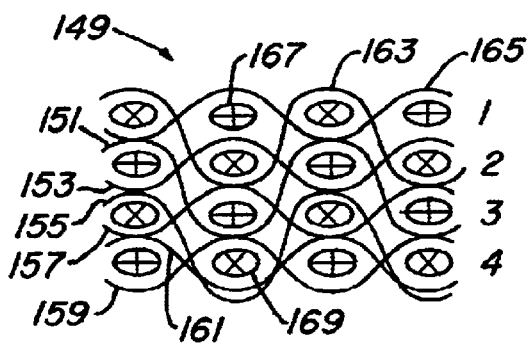
FIG. 12 depicts a fill-tow weave pattern used to weave a hybrid preform with carbon and glass fill fibers woven into layers of carbon and glass warp fibers and being in accordance with the invention.

Typically, preforms are woven using one type of fiber, for example, carbon (graphite) fibers, for both the warp and fill fibers. However, FIGS. 10 through 12 depict hybrid preform weave patterns which use fibers made form multiple materials, such as carbon and glass fibers. In the figures, glass fibers perpendicular to the viewing plane are indicated by an "o", whereas carbon fibers perpendicular to the viewing plane are indicated by an "x." These patterns can result in preforms having higher toughness, reduced cost, and optimized thermal-expansion characteristics. FIG. 10 shows four-layer preform weave pattern 137 in which the warp fibers 139 are carbon and the fill tows 141 are glass fibers. Conversely, FIG. 11 shows a four-layer weave pattern 143 in which all of the warp fibers 145 are glass fibers and the tow fibers 147 are carbon fibers.

In weave pattern 149 shown in FIG. 12, the types of fibers used for fill tows 151, 153, 155, 157, 159, 161, 163, 165 and warp fibers 167, 169 are alternated between glass fibers and carbon fibers. Fill tows 151, 153, 159, and 161 are carbon fibers, whereas tows 155, 157, 163, 165 are glass fibers. Warp fiber 167 is a glass fiber; warp fiber 169 is a carbon fiber. The pattern shown has four layers, which are numbered 1 through 4, and fibers 167, 169 are arranged in a "checkerboard" pattern throughout the layers. In layers 1 and 3, the first and third fibers are carbon fibers 169, and the second and fourth fibers are glass fibers 167. In layers 2 and 4, the first and third fibers are glass fibers 167, and the second and fourth fibers are carbon fibers 169.

An alternative method for creating preforms uses the warp fibers to interlock the layers of a preform. Again referring to FIGS. 10 through 12, the fibers in the viewing plane could be warp fibers, and the fibers perpendicular to the viewing plane could be fill fibers. The fill fibers would be used to simply interlock the warp fibers in a single layer without interlocking the layers, but the fill fibers would still be used to create legs extending from a preform.

The advantages of the present invention include the ability to weave a high strength and easy-to-use preform for assembling components into structures. A plurality of shapes can be created from using the weave sequences to weave fill fibers into a plurality of layers of warp fibers. The weave interlocks the warp fibers of each layer and interlocks the layers to each other. The weave can produce one or more legs that extend from a base to produce T- or Pi-shaped preform. By alternately using fibers made from carbon and glass, the strength, cost, and thermal expansion of a preform can be optimized.

While the invention has been shown in only some of its forms, it is not thus limited but is susceptible to various changes and modifications without departing from the spirit thereof.

We claim:

1. A three-dimensional preform weave architecture, comprising:
    a plurality of adjacent layers, each layer having a plurality of warp fibers, all warp fibers being parallel to each other;
    a plurality of fill fibers woven among the layers of warp fibers to form a base and at least one leg extending from the base, the base and each leg being formed from at least two layers of warp fibers, the base having a first edge and a second edge, each leg having a inner end and an outer end; and wherein
        each fill fiber has a beginning at the first edge of the base, then extends toward a central portion of the base, then exits the layers of the base and extends into the layers of each leg at the inner end of each leg, then extends to the outer end of each leg before returning to the inner end of each leg, then exits the layers of each leg at the inner end of each leg and extends back into the layers of the base, then extends to the second edge of the base before returning to the first edge of the base, the fill fibers connecting each leg to the base, the fill fibers interlocking the layers of the base and interlocking the layers of each leg, the fill fibers also interlocking the warp fibers within each layer.

2. The weave architecture of claim 1, wherein:
the plurality of adjacent layers comprises at least four layers.

3. The weave architecture of claim 1, wherein:
the layers are interlocked by running a portion of a fill-tow pattern over a warp fiber in a first layer in a first column and below a warp fiber in an adjacent, second layer in an adjacent, second column, the second layer being below the first layer.

4. The weave architecture of claim 1, wherein:
at least a substantial majority of the fill fibers connecting each leg to the base exits the base between a set of two columns of warp fibers in the base.

5. The weave architecture of claim 1, wherein:
the fill fibers connecting each leg to the base exit the base between at least two sets of two columns of warp fibers.

6. The weave architecture of claim 1, wherein:
the fill fibers form a T-shaped pattern having one leg extending from a base.

7. The weave architecture of claim 1, wherein:
the fill fibers form a Pi-shaped pattern having two legs extending from a base.

8. The weave architecture of claim 1, wherein:
each fill fiber additionally extends from the first edge of the base to the second edge of the base and back to the first edge of the base without entering each leg.

9. The weave architecture of claim 1, further comprising:
each fill fiber additionally extends from the first edge of the base to the second edge of the base and back to the first edge of the base without entering each leg,
the fill fibers form a T-shaped pattern having one leg extending from a base.

10. The weave architecture of claim 1, further comprising:
each fill fiber additionally extends from the first edge of the base to the second edge of the base and back to the first edge of the base without entering each leg,
the fill fibers form a Pi-shaped pattern having two legs extending from a base.

11. The weave architecture of claim 1, wherein:
the fill fibers and warp fibers are formed from carbon fibers.

12. The weave architecture of claim 1, wherein:
the fill fibers and warp fibers are formed from glass fibers.

13. The weave architecture of claim 1, wherein:
the fill fibers are formed from glass fibers; and
the warp fibers are formed from carbon fibers.

14. The weave architecture of claim 1, wherein:
the fill fibers are formed from carbon fibers; and
the warp fibers are formed from glass fibers.

15. The weave architecture of claim 1, wherein:
a first portion of the fill fibers are formed from carbon fibers, and a second portion of the fill fibers are formed from glass fibers; and
a first portion of the warp fibers are formed from glass fibers, and a second portion of the warp fibers are formed from carbon fibers.

16. The weave architecture of claim 1, further comprising:
a stepped taper at the edges of the base, wherein each layer of warp fibers in the base has a longer length than a prior, adjacent layer of warp fibers in the base.

17. The weave architecture of claim 1, wherein:
a stepped taper at the outer end of each leg, wherein each layer of warp fibers in the leg has a longer length than a prior, adjacent layer of warp fibers in the leg.

18. The weave architecture of claim 1, wherein:
a stepped taper is formed at the inner end of each leg by adding successively longer layers of warp fibers, the taper forming a radius between the inner end of each leg and the base.

19. The weave architecture of claim 1, wherein:
at least a portion of the warp fibers interlock at least a portion of the fill fibers.

20. A three-dimensional preform weave architecture, comprising:
    a plurality of adjacent layers, each layer having a plurality of warp fibers, all warp fibers being parallel to each other;
    a plurality of fill fibers woven among the layers of warp fibers to form a base and first and second legs extending from opposite sides of the base, the base having a first edge and an opposing second edge, each leg having a inner end and an outer end; and wherein each fill fiber has a beginning at the first edge of the base and extends toward a central portion of the base, then exits the layers of the base and extends into the layers of the first leg at the inner end of the first leg, then extends to the outer end of the first leg before returning to the inner end of the first leg, then extends through the layers of the base and into the layers of the second leg at the inner end of the second leg, then extends to the outer end of the second leg before returning to the inner end of the second leg, then exits the layers of the second leg and extends into the layers of the base, then extends to the second edge of the base before returning to the first edge of the base, the fill fibers connecting the legs to the base, the fill fibers interlocking the layers of the base and interlocking the layers of each leg, the fill fibers also interlocking the warp fibers within each layer.

21. The weave architecture of claim 20, wherein:
the plurality of adjacent layers comprises at least four layers.

22. The weave architecture of claim 20, wherein:
the layers are interlocked by running a portion of a fill-tow pattern over a warp fiber in a first layer in a first column and below a warp fiber in an adjacent, second layer in an adjacent, second column, the second layer being below the first layer.

23. The weave architecture of claim 20, wherein:
at least a portion of the warp fibers interlock at least a portion of the fill fibers.

24. A three-dimensional preform weave architecture, comprising:
a plurality of adjacent layers, each layer having a plurality of warp fibers, all warp fibers being parallel to each other;
a plurality of fill fibers woven among the layers of warp fibers to form a base and first and second legs extending from opposite sides of the base, the base having a first end and an opposing second end, each leg having a inner end and an outer end; and wherein
a first portion of the fill fibers begins at the first end of the base and extends to the second end of the base before returning to the first end of the base;
a second portion of the fill fibers begins at the outer end of the first leg and extends to the outer end of the second leg before returning to the outer end of the first leg; and
the fill fibers connect the legs to the base, the fill fibers interlocking the layers of the base and interlocking the layers of each leg, the fill fibers also interlocking the warp fibers within each layer.

25. The weave architecture of claim 24, wherein:
at least a portion of the warp fibers interlock at least a portion of the fill fibers.

26. A three-dimensional preform weave architecture, comprising:
a plurality of adjacent layers, each layer having a plurality of first fibers;
a plurality of second fibers woven among the layers of first fibers, the second fibers interlocking the layers of the first fibers and also interlocking each of the first fibers within each layer; and wherein
the first fibers and the second fibers form a preform having a base and at least one leg extending from the base.

27. The weave architecture of claim 26, wherein:
the first fibers are warp fibers; and
the second fibers are fill fibers.

* * * * *